(12) United States Patent
Püschner et al.

(10) Patent No.: US 7,240,847 B2
(45) Date of Patent: Jul. 10, 2007

(54) CHIP CARD

(75) Inventors: Frank Püschner, Kelheim (DE); Reinhard Proske, Wackersdorf (DE); Peter Stampka, Burglenfenfeld (DE); Andreas Müller-Hipper, Regensburg (DE)

(73) Assignees: Infineon Technologies AG, Munich (DE); Circle Smart Card AG, Erfurt (DE)

( * ) Notice: Subject to any disclaimer, the term of this patent is extended or adjusted under 35 U.S.C. 154(b) by 0 days.

(21) Appl. No.: 11/078,202

(22) Filed: Mar. 10, 2005

(65) Prior Publication Data
US 2005/0199734 A1   Sep. 15, 2005

(30) Foreign Application Priority Data
Mar. 10, 2004   (DE) ................ 10 2004 011 702

(51) Int. Cl.
*G06K 19/06* (2006.01)
(52) U.S. Cl. ........................... 235/492; 257/679
(58) Field of Classification Search ............... 235/492, 235/487; 257/679
See application file for complete search history.

(56) References Cited

U.S. PATENT DOCUMENTS

| | | | |
|---|---|---|---|
| 6,326,683 B1 * | 12/2001 | Houdeau et al. | ............. 257/679 |
| 6,390,375 B2 | 5/2002 | Kayanakis | |
| 6,651,891 B1 * | 11/2003 | Zakel et al. | ................ 235/487 |
| 2002/0089049 A1 * | 7/2002 | Leduc et al. | ................ 257/679 |
| 2003/0076662 A1 | 4/2003 | Miehling | |

FOREIGN PATENT DOCUMENTS

| | | |
|---|---|---|
| CN | 1209210 | 2/1999 |
| CN | 1213449 | 4/1999 |
| DE | 271401 A * | 8/1989 |
| DE | 44 24 396 A1 | 1/1996 |
| DE | 196 37 306 C1 | 5/1998 |
| DE | 197 32 353 A1 | 2/1999 |
| DE | 101 56 803 A1 | 5/2003 |
| DE | 102 20 239 A1 | 12/2003 |
| FR | 2 636 755 A1 | 3/1990 |
| FR | 2 797 977 A1 | 3/2001 |
| JP | 2003099745 A * | 4/2003 |
| RU | 2 169 389 C2 | 11/1998 |
| WO | WO-97/23843 A1 | 7/1997 |
| WO | WO-01/18749 A2 | 3/2001 |
| WO | WO-01/41062 | 6/2001 |
| WO | WO 01/43064 A2 | 6/2001 |

* cited by examiner

*Primary Examiner*—Michael G. Lee
*Assistant Examiner*—Kristy A. Haupt
(74) *Attorney, Agent, or Firm*—Dickstein, Shapiro, LLP.

(57) ABSTRACT

A contactless chip card and a method for producing a contactless chip card in which a plastic carrier having clearances is provided, on which an antenna coil is arranged on an upper side of the plastic carrier and a device having an integrated circuit is arranged on a rear side of the plastic carrier that is opposite from the upper side, an electrical connection is produced between the coil and the device, the plastic carrier is introduced into an injection mold and a card body is molded onto the rear side of the plastic carrier by the injection-molding process.

7 Claims, 1 Drawing Sheet

CHIP CARD

CROSS-REFERENCE TO RELATED APPLICATION

This application claims priority to German Patent Application Ser. No. 102004011702.0, filed Mar. 10, 2004, and which is incorporated herein by reference in its entirety.

FIELD OF THE INVENTION

The present invention relates to a method for producing a contactless chip card and to a contactless chip card.

BACKGROUND OF THE INVENTION

Production of contactless chip cards of a standardized format takes place for example by the laminating process, in which an antenna coil and at least one semiconductor chip are arranged on a carrier film and integrated in a card body formed by laminating a number of films.

A further procedure envisages the arrangement of the semiconductor chip and an antenna coil on a substrate to which the card body is applied by a molding process, so that the card body completely covers the semiconductor chip and the antenna coil.

In DE 197 32 353 A1 there is specified a method for producing a contactless chip card in which a two-dimensional card body produced by an injection-molding technique and provided with a clearance is produced, an electrically conductive coil is arranged on the surface of the clearance and the chip is aligned in the clearance and connected in an electrically conducting manner to terminals of the coil. The clearances are subsequently sealed with a casting compound.

The method proposed in DE 101 56 803 A1 for producing a contactless data carrier envisages the use of a workpiece carrier as part of an injection mold onto which the coil is placed and encapsulated on both sides.

In WO 97/23843 A1, for the production of a contactless chip card, a coil is applied to a carrier film and the carrier film is introduced into an injection mold. Integrated circuit components to be electrically bonded with the coil are positioned over the carrier film and connected to the coil. A card body is subsequently molded onto the carrier film.

DE 196 37 306 C1 proposes a method for producing a contactless chip card in which a carrier film having a coil is covered with a top layer, the side of the carrier film that is opposite from the coil is covered with a card layer and the formation is introduced into an injection mold and injected with a polymer material.

The methods mentioned above have several disadvantages. The production of a chip card by means of a laminating process is very elaborate and cost-intensive. The positioning of the coil on a substrate that is to be performed according to the prior art has the consequence in the case of a molding process that the coil is always completely encapsulated. The pressure resulting from the injection of the molding compound into the mold means that there is the possibility at any time of the windings of the antenna coil becoming detached from the substrate.

SUMMARY OF THE INVENTION

An object of the invention is therefore to provide a contactless chip card and develop a method for producing a chip card in such a way that the chip card can be produced in a simple and low-cost manner and that damage to the antenna coil integrated in the chip card produced is ruled out.

Accordingly, the method for producing the chip card envisages the provision of a plastic carrier which has clearances and on which an electrically conductive coil is arranged on an upper side. A device having integrated circuits arranged on the rear side of the plastic carrier, for example a semiconductor chip, is connected to the coil by means of via holes arranged in the clearances in the plastic carrier. To produce the card body, the plastic carrier is introduced into an injection mold and the card body is molded onto the rear side of the plastic carrier by means of a molding process.

A molding process is to be understood for the purposes of the invention, and as customary in the prior art, as meaning a method for producing a card body which makes use of a form of housing in which its cavity is filled with a plastic. The shape and size of the card body are determined by the formation of the cavity. When applying the molding process that is used for producing the chip card according to the invention, the customary molds and apparatuses can be used. All thermosetting or thermoplastic materials conventionally used in molding processes can be used.

It is particularly advantageous that the upper side of the plastic carrier, with the antenna coil arranged on it, forms one of the surfaces or an outer side of the completed chip card, while the semiconductor chip is arranged inside the chip card. Consequently, the antenna coil is not covered by the molding compound when the molding compound is injected into the mold, so that windings of the antenna coil also cannot become detached from the carrier as a result of the pressure produced during injection. When producing the card body, it is possible for production steps and tools with which a module and/or card manufacturer is in any case familiar to be used exclusively. Furthermore, there is no longer any need for elaborate and expensive method steps that are to be performed by means of laminating processes. On account of the arrangement of the coil on the side of the plastic carrier that is opposite from the chip, it is also possible without any problem for a number of chips to be arranged on the carrier. After completion of the chip card, the antenna on the card surface can be covered and planarized with a top layer during the conventional printing.

In an advantageous development, the device is arranged on the plastic carrier in such a way that, when the plastic carrier is introduced into the injection mold, the device is arranged on a side of the injection mold that is opposite from the side having an injection runner. This has the advantage that the device arranged on the carrier is not damaged by the pressure produced during the injection of the molding compound.

The contactless chip card according to the invention, comprising a card body and a plastic carrier arranged in the card body, a coil arranged on the plastic carrier and a device having an integrated circuit which is connected in an electrically conducting manner to the coil, is formed in such a way that the coil is arranged on an upper side of the plastic carrier that is opposite from the device. The positioning of the coil on the upper side of the plastic carrier has the advantage that the chip card can be produced in a low-cost injection-molding processes.

A further embodiment of the chip card provides that the upper side of the plastic carrier having the coil is provided with a top layer for planarizing and covering the coil.

BRIEF DESCRIPTION OF THE DRAWINGS

The invention is explained in more detail below on the basis of the drawings, in which.

DETAILED DESCRIPTION OF PREFERRED EMBODIMENTS OF THE INVENTION

Figure 1:
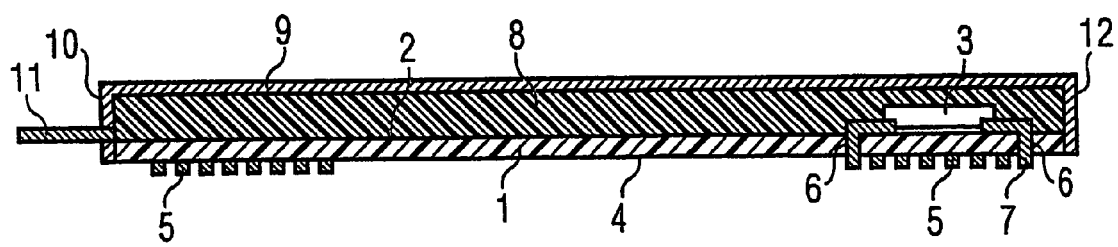
FIG. 1 shows a schematic sectional representation of a plastic carrier and an injection mold into which the plastic carrier is introduced for the production of a card body.

FIG. 1 is intended to explain the method according to an embodiment og the invention for producing a chip card. A plastic carrier 1, on which a semiconductor chip 3 with contact areas that are not represented here is arranged on a rear side 2, is used in a method according to the invention. Applied to the upper side 4 of the plastic carrier 1 that is opposite from the semiconductor chip 3 is an antenna coil 5. The antenna coil 5 is connected in an electrically conducting manner to the semiconductor chip 3 by means of via holes 7 through clearances 6 arranged in the plastic carrier 1.

To produce a card body 8, the plastic carrier 1 is introduced into an injection mold 9, the cavity of which is formed in a way corresponding to the shape of the card body 8 to be formed. In this case, the plastic carrier 1 is aligned in the injection mold 9 in such a way that the cavity of the injection mold 9 encloses only the rear side 2 of the carrier 1. The injection mold 9 has on one side 10 an injection runner 11, through which a liquid polymer material is injected into the cavity. The molding processes can be carried out in a way that is customary in the prior art, it also being possible for the customary thermoplastic or thermosetting materials to be used as materials for producing the card body 8.

In order that the semiconductor chip 3 arranged on the plastic carrier 1 is not damaged by the pressure produced during the injection, the semiconductor chip is arranged on the side 12 of the injection mold 9 that is opposite from the injection runner 11. After the encapsulation of the plastic carrier 1 or the semiconductor chip 3 and once curing of the card body 8 has taken place, the chip card 13 produced in this way is removed from the injection mold 9. The upper side 4 of the carrier 1 forms an outer side of the chip card 13, in which the coil 5 is visible. For planarizing or covering the antenna coil 5, this outer side is coated in a subsequent process step with a top layer which cannot be seen here. This top layer can be printed by customary measures.

Figure 2:
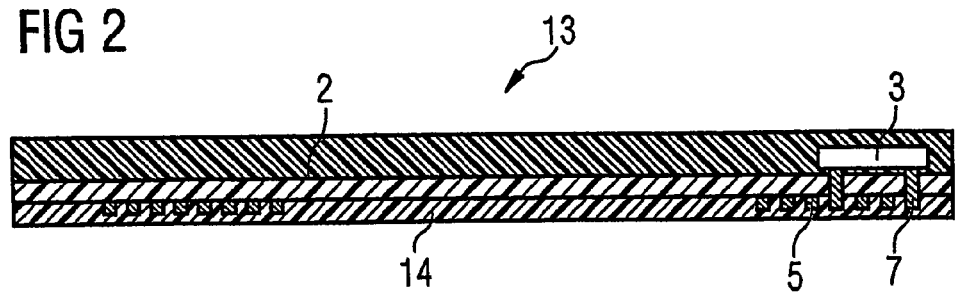
FIG. 2 shows a schematic sectional representation of a chip card of an embodiment according to the invention.

FIG. 2 shows the chip card 13 according to an embodiment of the invention which has been produced by the method described above. The semiconductor chip 3 arranged on the plastic carrier 1 is now completely embedded in the card body 8. The outer side of the chip card 13, formed by the upper side 4 of the carrier 1, is provided with a top layer 14, so that the antenna coil 5 is covered by the latter.

The method according to the invention makes it possible for contactless chip cards to be produced in a low-cost injection-molding processes.

The invention claimed is:

1. A method for producing a contactless chip card, comprising the steps of:
   providing a plastic carrier having clearances;
   arranging an antenna coil on an upper side of the plastic carrier;
   arranging a device having integrated circuits on a rear side of the plastic carrier that is opposite from the upper side;
   producing an electrical connection between the coil and the device;
   introducing the plastic carrier into an injection mold; and
   molding a card body onto the rear side of the plastic carrier by the injection-molding process.

2. The method as claimed in claim 1, wherein the coil is connected in an electrically conducting manner to terminal contacts of the device by means of metallic via holes formed in the clearances.

3. The method as claimed in claim 2, further comprising the steps of:
   covering and planarizing the coil arranged on the upper side of the plastic carrier by means of a top layer; and
   simultaneously printing on the upper side and/or the top layer.

4. The method as claimed in claim 1, wherein the device is arranged on the plastic carrier such that when the plastic carrier is introduced into the injection mold, the device is arranged on a side of the injection mold that is opposite from the side having an injection runner.

5. The method as claimed in claim 1, wherein the production of the chip card takes place in a continuous process.

6. A contactless chip card comprising:
   a card body;
   a plastic carrier having clearances arranged in the card body;
   a coil arranged on the plastic carrier; and
   a device having an integrated circuit which is connected in an electrically conducting manner to the coil,
   wherein the coil is arranged on a side of the plastic carrier that is opposite from the device and the card body is injection molded on the device side of the plastic carrier.

7. The contactless chip carrier as claimed in claim 6, further comprising a top layer covering the coil and forming an outer side of the chip card.

* * * * *

UNITED STATES PATENT AND TRADEMARK OFFICE
CERTIFICATE OF CORRECTION

PATENT NO. : 7,240,847 B2 Page 1 of 1
APPLICATION NO. : 11/078202
DATED : July 10, 2007
INVENTOR(S) : Reinhard Proske et al.

It is certified that error appears in the above-identified patent and that said Letters Patent is hereby corrected as shown below:

On the Title Page,

Item (75) Inventors: "Peter Stampka, Burglenfenfeld (DE);" should read --Peter Stampka, Burglengenfeld (DE);--

At column 2, line 64, "processes" should read --process--

At column 3, line 15, "og" should read --of--

Signed and Sealed this

Twenty-seventh Day of May, 2008

JON W. DUDAS
*Director of the United States Patent and Trademark Office*